(12) United States Patent
Oba et al.

(10) Patent No.: US 8,786,720 B2
(45) Date of Patent: Jul. 22, 2014

(54) BIOLOGICAL SPECIMEN OBSERVATION METHOD

(75) Inventors: Masahiro Oba, Tokyo (JP); Nobuyuki Nagasawa, Gunma (JP)

(73) Assignee: Olympus Corporation, Tokyo (JP)

( * ) Notice: Subject to any disclaimer, the term of this patent is extended or adjusted under 35 U.S.C. 154(b) by 623 days.

(21) Appl. No.: 12/332,540

(22) Filed: Dec. 11, 2008

(65) Prior Publication Data

US 2009/0161929 A1 Jun. 25, 2009

(30) Foreign Application Priority Data

Dec. 21, 2007 (JP) ................................. 2007-330423

(51) Int. Cl.
*H04N 5/235* (2006.01)

(52) U.S. Cl.
USPC .......................... 348/221.1; 424/9.6; 382/128

(58) Field of Classification Search
USPC ......................... 382/128; 348/207.99; 424/9.6
See application file for complete search history.

(56) References Cited

U.S. PATENT DOCUMENTS

| | | | |
|---|---|---|---|
| 6,748,259 B1 * | 6/2004 | Benaron et al. | 600/476 |
| 7,873,407 B2 * | 1/2011 | Levenson et al. | 600/476 |
| 2005/0004797 A1 * | 1/2005 | Azencott | 704/226 |
| 2006/0062557 A1 * | 3/2006 | Imada | 396/55 |
| 2007/0103562 A1 * | 5/2007 | Kaneko et al. | 348/222.1 |
| 2007/0121198 A1 * | 5/2007 | Suzuki et al. | 359/368 |
| 2008/0018778 A1 * | 1/2008 | Matsuo et al. | 348/362 |
| 2008/0030587 A1 * | 2/2008 | Helbing | 348/208.4 |
| 2008/0079842 A1 * | 4/2008 | Aoki et al. | 348/366 |
| 2008/0253968 A1 * | 10/2008 | Oba et al. | 424/9.6 |
| 2010/0026858 A1 * | 2/2010 | Kanamori | 348/241 |
| 2010/0118201 A1 * | 5/2010 | Jeong et al. | 348/581 |

FOREIGN PATENT DOCUMENTS

| | | |
|---|---|---|
| JP | H05-236422 A | 9/1993 |
| JP | 2005-507489 A | 3/2005 |
| JP | 2005-214924 | 8/2005 |
| JP | 2006-317406 | 11/2006 |
| WO | WO 02/068932 A2 | 9/2002 |

OTHER PUBLICATIONS

Japanese Official Action mailed Apr. 17, 2012 in corresponding Japanese Patent Application No. 2007-330423.

* cited by examiner

*Primary Examiner* — Twyler Haskins
*Assistant Examiner* — Fayez Bhuiyan
(74) *Attorney, Agent, or Firm* — Scully, Scott, Murphy & Presser, P.C.

(57) ABSTRACT

When a biological specimen, such as living cells, biological tissue, or a small animal, is quantitatively observed, the specimen is observed for a long time or over a long period, while maintaining the quantitative properties. Provided is an observation method of observing luminescence or fluorescence emitted from a biological specimen. The observation method includes a referring step of referring to image data previously acquired; an intensity determining step of determining whether the intensity of the image data previously acquired is saturated; an exposure dividing step of dividing the exposure of the image data previously acquired one time into a plurality of exposures when the intensity is determined as being saturated in the intensity determining step; an image acquiring step of acquiring images the same number of times as the number of divided exposures; and an integrating step of integrating the images separately acquired multiple times into a single image.

5 Claims, 6 Drawing Sheets

BIOLOGICAL SPECIMEN OBSERVATION METHOD

BACKGROUND OF THE INVENTION

1. Field of the Invention

The present invention relates to a method for observing a biological specimen.

This application is based on Japanese Patent Application No. 2007-330423, the content of which is incorporated herein by reference.

2. Description of Related Art

Recently, in research fields such as cellular biology or molecular cell biology, it has become necessary to observe biological cells by using green fluorescent protein (GFP) or a gene encoding luciferase, which is a bioluminescent enzyme, as a reporter of expression by labeling a specific portion or a functional protein inside the cells with a fluorescent label or a chemiluminescent label. Furthermore, techniques that use light for observing the conditions inside a biological specimen such as a small animal while living (in vivo) from outside the body have become important for, for example, medical investigation.

In general, for example, in the case of fluorescence observation of living cells into which a fluorescent protein is introduced, the intensity of a fluorescent image varies with time according to the expression state of the fluorescent protein or the activity of the cells. There are a variety of patterns of variation depending on the subjects being observed. For example, there are cases where the low intensity in the early stage of cell culturing increases with the expression of the fluorescent protein, cases where the intensity decreases with a decrease in the level of expression of the fluorescent protein, or cases where increases and decreases of intensity are repeated. These variations occur during luminescence observation of biological activity using living cells labeled with a luminescent label or during analysis of the position or size of a tumor by fluorescence observation of a biological specimen, such as a small animal, using a fluorescent protein. In these observations, it is important to acquire stable images that can be used for quantitative evaluation, over a period of time.

In one technique for acquiring stable images over a period of time, when images of fluorescence emitted from cells irradiated with excitation light are acquired at predetermined time intervals with a time-lapse image-acquisition system, it is known that the quantity of exposure light for acquiring a subsequent fluorescent image is determined using the previously acquired fluorescent image in order to prevent saturation of the fluorescent intensity (for example, Japanese Unexamined Patent Application, Publication No. 2005-214924) and that saturation of intensity is prevented by determining exposure conditions for acquiring a subsequent image based on the intensity values of cell images already captured, in each visual field (for example, Japanese Unexamined Patent Application, Publication No. 2006-317406).

In conventional methods, the optimum intensity value is obtained by changing the observation conditions, such as the exposure time, during the observation. With this approach, however, there is a disadvantage in that the quantitative properties tend to be lost when the observation conditions are changed. In particular, in the case where the quantitative properties are required to be maintained in long-period observation, it is undesirable to change the observation conditions, such as the exposure time or illumination power, during the observation.

BRIEF SUMMARY OF THE INVENTION

The present invention has been made in consideration of the above circumstances, and an object thereof is to provide an observation method for quantitatively observing a biological specimen, such as living cells, biological tissue, or a small animal, for a long time or over a long period while maintaining quantitative properties.

In order to solve the above-mentioned problems, the present invention employs the following solutions.

A first aspect of the present invention relates to an observation method of observing luminescence or fluorescence emitted from a biological specimen, including a referring step of referring to image data previously acquired; an intensity determining step of determining whether the intensity of the image data previously acquired is saturated; an exposure dividing step of dividing the exposure of the image data previously acquired one time into a plurality of exposures when the intensity is determined as being saturated in the intensity determining step; an image acquiring step of acquiring images the same number of times as the number of divided exposures; and an integrating step of integrating the images separately acquired multiple times into a single image.

In the above first aspect, the biological specimen can be quantitatively observed by integrating a plurality of separately acquired images into a single image.

A second aspect of the present invention relates to an observation method of observing luminescence or fluorescence emitted from a biological specimen, including a referring step of referring to image-capture conditions of image data acquired in the past; an image acquiring step of acquiring an image under the image-capture conditions; a comparison step of comparing the acquired image to the image data in the past; an intensity determining step of determining, based on the comparison, whether image acquisition can be operated within a valid intensity value range from the start of the image acquisition to the end of the image acquisition; and an adjusting step of adjusting the image-capture conditions when it is determined in the determining step that the image acquisition cannot be operated within the valid intensity value range.

In the above second aspect, the biological specimen can be quantitatively observed using the past data.

A third aspect of the present invention relates to an observation method of observing luminescence or fluorescence emitted from a biological specimen, including an image acquiring step of acquiring images under a plurality of observation conditions; an intensity determining step of determining whether analysis results of the acquired images are within an appropriate intensity value range; and an interpolating step of interpolating inappropriate intensity value data with the other analysis data acquired under the plurality of conditions when it is determined in the determining step that the intensity value is out of the appropriate intensity value range.

In the above third aspect, the biological specimen can be quantitatively observed by acquiring images under a plurality of conditions.

The present invention affords an advantage in that observation for a long time or over a long period can be carried out while maintaining quantitative properties in the case where a biological specimen, such as living cells, biological tissue, or a small animal, is quantitatively observed.

DETAILED DESCRIPTION OF THE INVENTION

The biological specimen observation method according to embodiments of the present invention will now be described with reference to the drawings.

Figure 1:
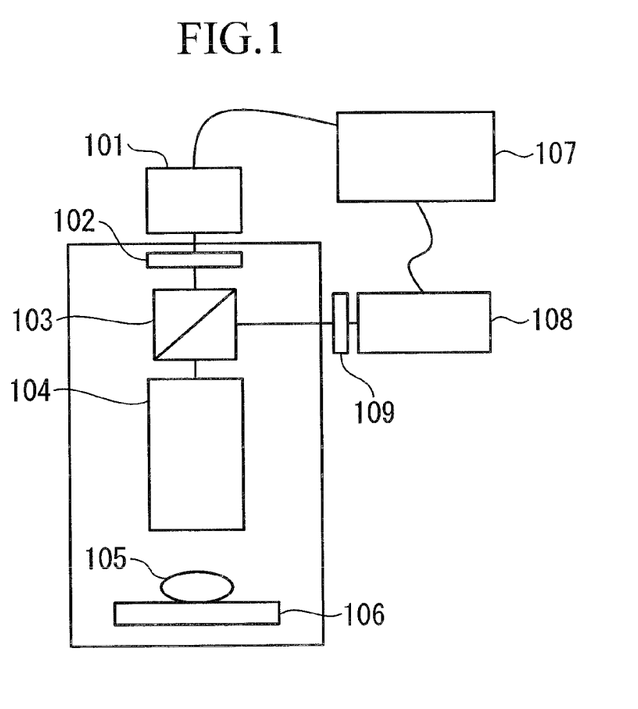
FIG. 1 is a diagram illustrating the overall configuration of an observation apparatus (using coaxial illumination) according to first and third embodiments of the present invention.

A first embodiment according to the present invention relates to a method for observing a biological specimen, which is a live small laboratory animal into which tumor cells labeled with a fluorescent protein are subcutaneously introduced, by fluorescence observation of the growth of the tumor. FIG. 1 schematically shows an example configuration of an observation apparatus using coaxial illumination, and FIG. 2 schematically shows an example configuration of an observation apparatus using oblique illumination.

As shown in FIG. 1, light emitted from a light source 108 is filtered through a filter 109 that transmits only light having a wavelength that excites a fluorescent protein. The light is reflected by a dichroic mirror 103 and is radiated onto a specimen 105 on a stage 106 through an objective optical system 104. Fluorescence emitted from the specimen 105 travels in reverse through the objective optical system 104, passes through the dichroic mirror 103, and is detected by a CCD camera 101 after unnecessary light is cut with a filter 102. The light detected by the CCD camera 101 is sent to a controller 107 for forming an image.

The controller 107, which is a computer such as a common PC, controls the image-capture conditions of the CCD camera 101, forms and displays an acquired image, controls, for example, the light level of the light source 108, and so forth. In addition, the controller 107 also has image processing and image calculation functions. If a plurality of the filters 102 and 109 and the dichroic mirrors 103 are provided and are electrically exchangable, the controller 107 also controls them. Furthermore, if the objective optical system 104 has a zoom function or if the stage 106 is electrically operated, the controller 107 also controls them.

Figure 2:
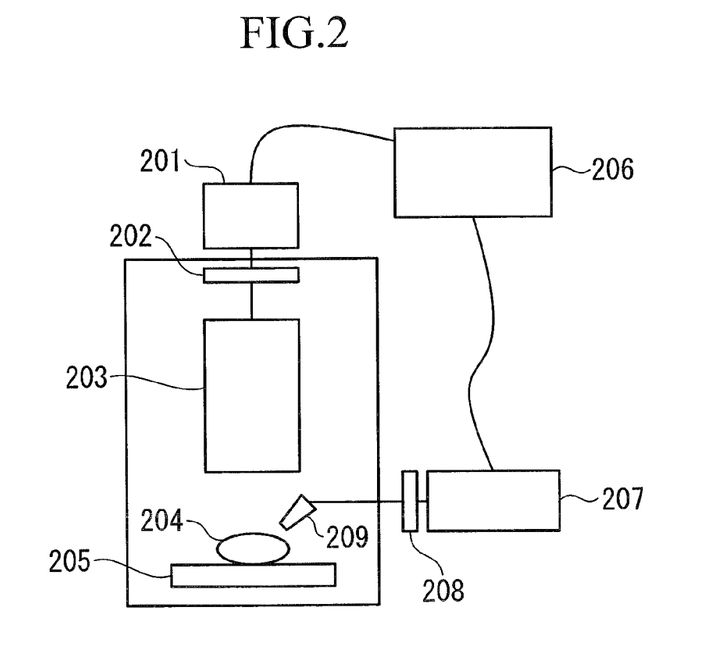
FIG. 2 is a diagram illustrating the overall configuration of an observation apparatus (using oblique illumination) according to the first and third embodiments of the present invention.

As shown in FIG. 2, light emitted from a light source 207 is filtered through a filter 208 that transmits only light having a wavelength that excites a fluorescent protein. The light is radiated onto a specimen 204 on a stage 205 through a fiber 209. Fluorescence emitted from the specimen 204 travels through an objective optical system 203 and is detected by a CCD camera 201 after unnecessary light is cut with a filter 202. The light detected by the CCD camera 201 is sent to a controller 206 for forming an image. The controller 206 has the same functions as those of the controller 107 shown in FIG. 1.

The specimen to be observed in this embodiment is, for example, a mouse into which tumor cells labeled with a green fluorescent protein (GFP) are subcutaneously introduced. Since a tumor grows in a period of several days to several weeks, the observation should be followed over the long term, though the duration of each observation is short. In general, when quantitative properties are required, observation is carried out while keeping the observation conditions, such as the quantity of excitation light and the image-capture conditions of the CCD camera, constant. However, the tumor may grow such that the intensity of an acquired image is saturated due to the growth of the tumor.

The observation procedure in this embodiment is as follows: The procedure of one observation cycle will be described with reference to FIG. 3. First, for example, a mouse is anesthetized via vascular anesthesia with, for example, isoflurane (not shown). The mouse is put on the stage, and necessary settings for fluorescence observation, for example, setting up the filters at the excitation side and the detection side and the dichroic mirror, are made in order to acquire images including the tumor region in the mouse.

Figure 3:
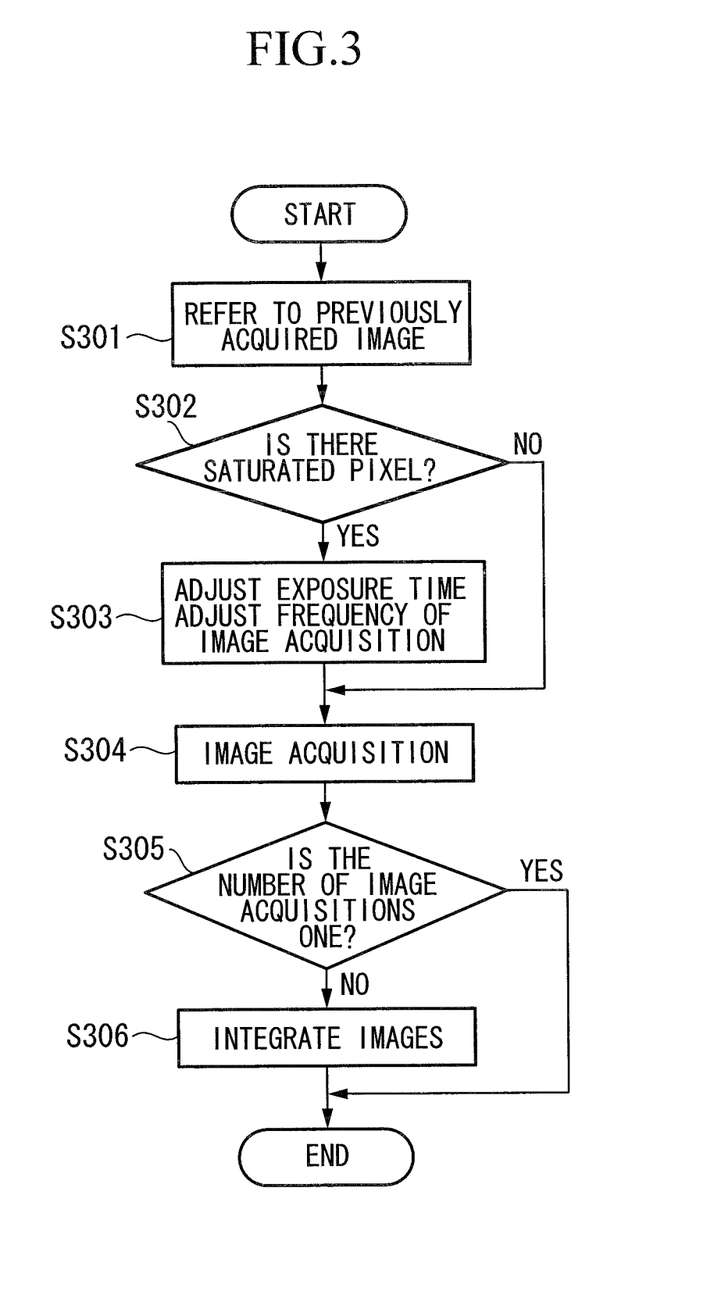
FIG. 3 is a flow chart showing an observation procedure according to the first embodiment of the present invention.

Subsequently, the image previously acquired is referred to (S301), and it is determined whether the intensity of each pixel is saturated (S302). If no pixels are saturated, image-capturing is operated under the same image-capture conditions (S304). For the first image-capturing operation, since there is no previous image, image-capturing is performed under desired conditions in consideration with the expected growth of the tumor. If there is a saturated pixel, the conditions are adjusted, for example, by adjusting the exposure time of this current image acquisition to one-half of that used for the image previously acquired thus doubling the numbers of frequency of the image-acquisitions (S303), and then image acquisition is carried out (S304). Then, it is determined whether or not the number of image acquisitions is one (S305). In this case, since a plurality of images is acquired in one observation, the acquired images are integrated (all images are added via image calculation) into a single image (S306). When the CCD camera is an 8-bit camera, an intensity value of 255 is the saturation value. It is meaningless if the intensity is saturated after integrating the images. Accordingly, it is necessary to handle the images as images with pixel values of 9 bits or more, for example, 16-bit images.

By doing so, this is substantially the same as observation without changing the observation conditions, such as exposure time. Consequently, it is possible to acquire images without saturation, while maintaining quantitative properties, by repeating the above-mentioned procedure for a single observation during the course of the experiment.

In the above-described embodiment, when determining whether a saturated pixel is present, in order not to cause an unnecessary increase in the number of image acquisitions by judging white noise occurring due to the characteristics of the CCD camera to be saturation, the determination of whether or not a saturated pixel is present may be conducted after the image processing, such as application of an averaging filter or a median filer to the previously acquired image.

In the above-described embodiment, when it is determined that there is saturation, such a determination may be made when the intensity value is higher than a predetermined assigned intensity value or an intensity value having a prescribed ratio with respect to the maximum intensity value (for example, since the maximum value of an 8-bit image is 255, a value of 220 is assigned, or a value of 90% of the maximum intensity is assigned). In addition, the determination may be made using a plurality of pixels that have a prescribed ratio of the entire image, instead of using only one pixel.

In the above-described embodiment, fluorescence observation of a small animal is employed as an example, but it may be applied to fluorescence observation or luminescence observation of, for example, living cells and biological tissue or to luminescence observation of a small animal.

Figure 4:
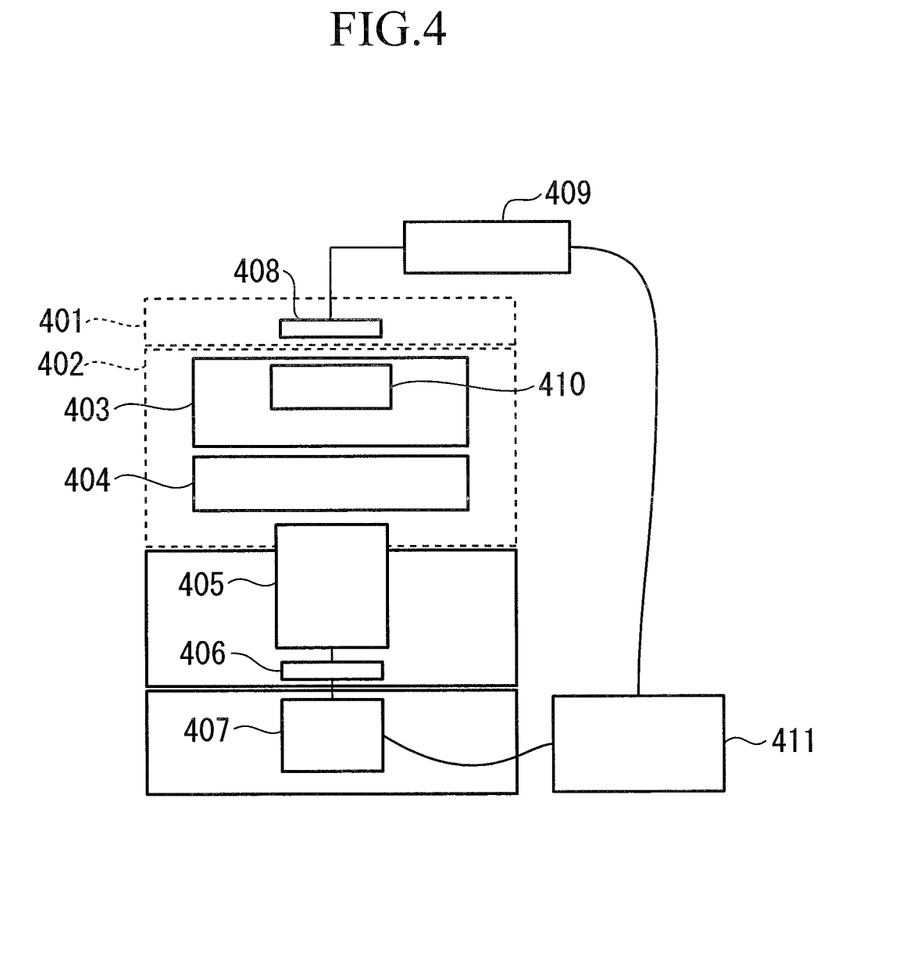
FIG. 4 is a diagram illustrating the overall configuration of an observation apparatus according to a second embodiment of the present invention.

A second embodiment according to the present invention relates to a method for observing a biological specimen by luminescence observation of living cells labeled with luciferase. FIG. 4 schematically shows an example configuration of an observation apparatus according to the second embodiment.

The observation of cells that are being cultured requires an environment mimicking an in vivo environment. As shown in FIG. 4, a specimen 410 is arranged in an incubator 403 on a stage 404. The specimen 410 is usually placed in a petri dish, and the stage 404 and the incubator 403 have openings (not shown) for observation.

In the case of luminescence observation, luminescence emitted from the specimen 410 travels through an objective optical system 405 and is detected by a CCD camera 407 after unnecessary light is cut with a filter 406. The light detected by the CCD camera 407 is sent to a controller 411 for forming an image. In observation using monochrome luminescence, the filter 406 need not be provided.

When a fluorescent protein or a fluorescent dye is used together with luciferase for labeling, fluorescence observation may be conducted. In the fluorescence observation, light emitted from a light source 409 is filtered through a filter 408 that transmits only light having a wavelength that excites, for example, the fluorescent protein. The light is radiated onto the specimen 410 in the incubator 403 on the stage 404. Light emitted from the specimen 410 travels through the objective optical system 405 and is detected by the CCD camera 407 after unnecessary light is cut with the filter 406. The light detected by the CCD camera 407 is sent to the controller 411 for forming an image.

The controller 411, which is a computer such as a common PC, controls the image-capture conditions of the CCD camera 407, forms and displays an acquired image, controls, for example, the light level of the light source 409, and so forth. In addition, the controller 411 can conduct image processing or image analysis and also can store the resulting data of the image analysis together with the observation conditions. It a plurality of the filters 406 and the filters 408 are provided and are electrically exchangable, the controller 411 can also control the plurality of filters. Furthermore, if the objective optical system 405 has a zoom function or when the stage 404 is electrically operated, the controller 411 can also control them.

By arranging a part or the entire portion of the apparatus in a light-shielding device, such as a chamber, that blocks light from the outside, weak light can be accurately and stably detected without being affected by external light. For example, a specimen can be placed so as to be shielded from light with a camera obscura 402 and a lid 401 in FIG. 4.

The luminescence observation will be described below.

Since the amount of luminescence from a luminescent specimen is extremely low, the exposure time tends to become long in order to take a clear image. In addition, when living cells are required to be observed over a period of time while being cultured, the observation may range over several tens of hours. For example, even if the observation is carried out while keeping the observation conditions, such as image-capture conditions of the CCD camera, constant, in some cases, cells may change to such a degree that the intensity of acquired images is saturated or when a change in the intensity cannot be detected because of the almost null intensity value, part of the experiment may become invalid.

Figure 5:
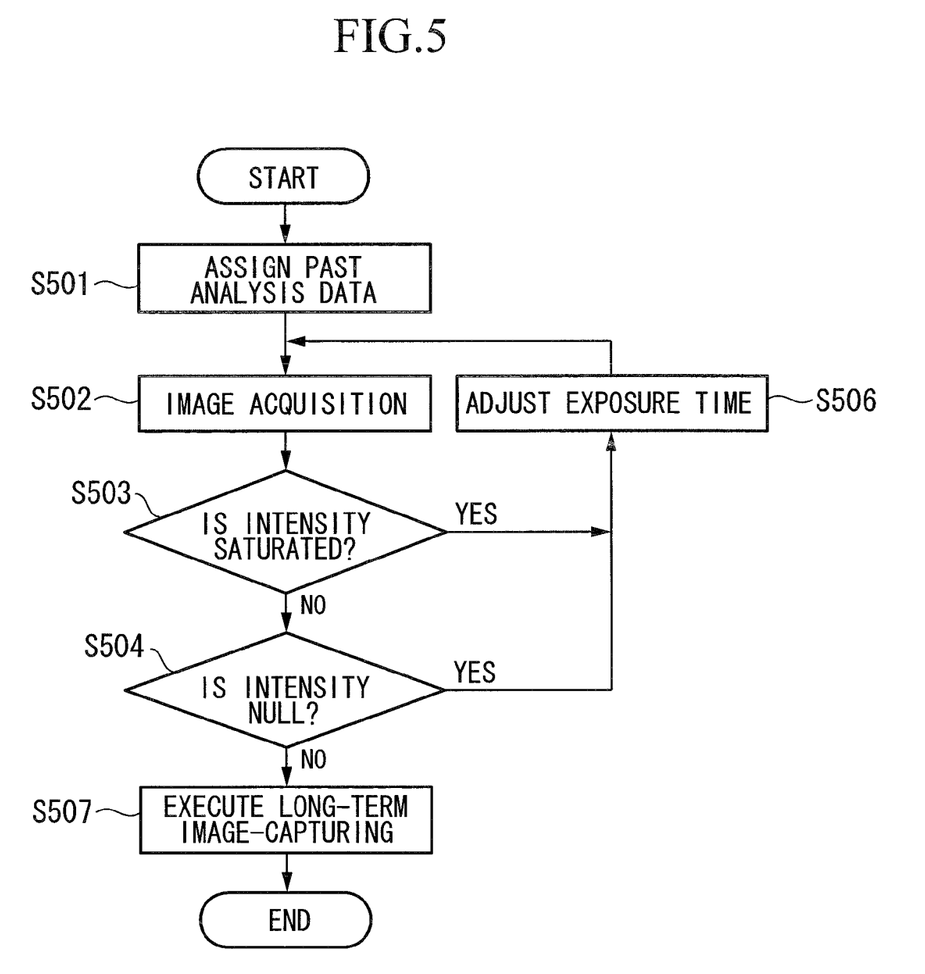
FIG. 5 is a flow chart showing an observation procedure according to the second embodiment of the present invention.

A procedure for observing a luminescent specimen with weak luminescence will be described with reference to FIG. 5.

First, a specimen is placed in an apparatus, and then analysis data for conditions that are the same as or similar to the conditions for the specimen type and the culturing conditions is assigned from the past data stored by the controller (S501). This allows predicting, from the past analysis data, for example, the maximum value and the minimum value of intensity, the time when the value reaches the maximum, the time when the value reaches the minimum, or the amount of a change in the intensity in one image-capturing operation.

Subsequently, an initial image of the specimen is acquired under the same image-capture conditions as those of the analysis data (S502). From the intensity value of the acquired image and the past analysis data stored by the controller, it is determined whether there is a possibility that the intensity value will be saturated or become null if future image-capturing is continued under the conditions for the first acquisition. If it is determined that the intensity value will be saturated (S503), the exposure time is shortened (S506). If it is determined that the intensity value will become null (S504), the exposure time is elongated (S506). Then, the image capturing is performed again (S502).

These steps of image acquisition and checking the conditions are repeated, and when conditions allowing subsequent image-capturing to be performed without trouble are determined, long-term image-capturing is started under the determined observation conditions (S507). By doing so, long period observation is possible without causing the saturated state of the intensity value or the null state of the intensity value.

In the above-described embodiment, when analysis data is stored, if the same observation conditions are already present, both the prior analysis data and the new analysis data may be stored and used for determination of the intensity value. Furthermore, new data may be created by, for example, normalizing the prior analysis data and the new analysis data and then stored.

In the above-described embodiment, luminescence observation of living cells is employed as an example, but it may be applied to fluorescence observation or luminescence observation of, for example, living cells, biological tissue, or a small animal.

Figure 6:
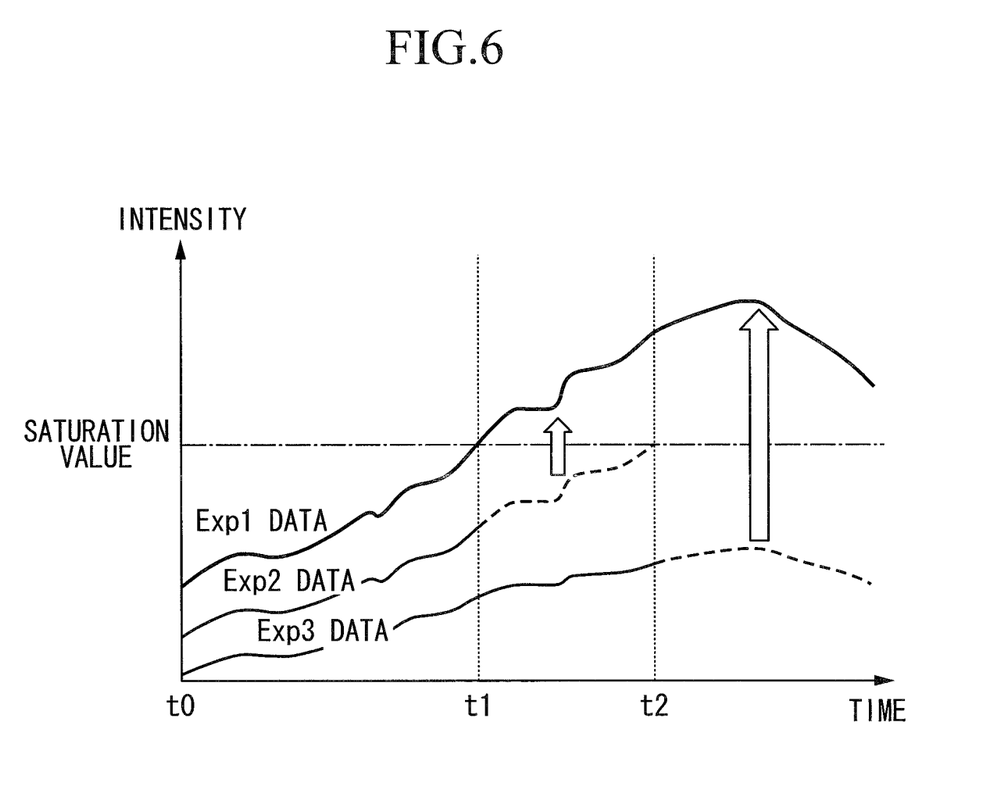
FIG. 6 is a graph showing a process of analyzing data according to the third embodiment of the present invention.
Figure 7:
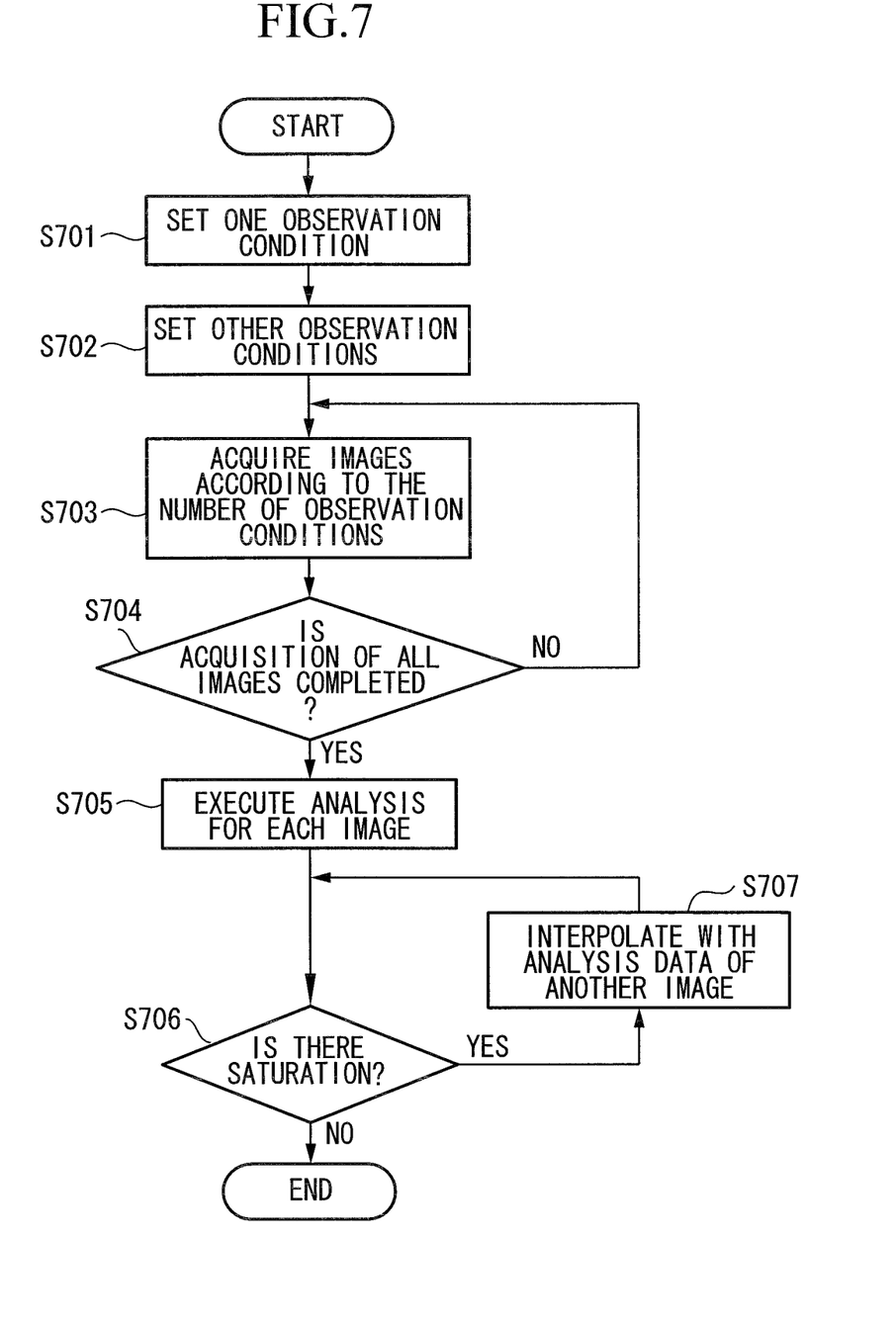
FIG. 7 is a flow chart showing an observation procedure according to the third embodiment of the present invention.

As shown in FIGS. 6 and 7, a third embodiment according to the present invention is a modification of the observation procedure according to the first embodiment. A case where a change in intensity of a tumor is analyzed over a period of time will be described below.

In this embodiment, a specimen is imaged from a single observation position under different observation conditions. For example, three exposure time patterns are determined in advance, and all image acquisitions are conducted with those exposure times.

The process of setting these different exposure times may be carried out by an automatic exposure setting function of the CCD camera, if it has one. If the CCD camera does not have an automatic exposure setting function, while acquiring images, an image-capture condition that does not saturate the intensity value is searched for (S701). Other image-capture conditions are determined based on the image-capture condition searched for in this way (S702). For example, with anticipation of future growth of the tumor, an exposure time one-half of the searched exposure time is set as the longest exposure time Exp 1; an exposure time one-half of Exp 1 is set as Exp 2; and an exposure time one-half of Exp 2 is set as Exp 3. Here, the exposure times are set to be halved, but the process of setting the image-capture conditions is not limited thereto.

Images are acquired according to these image-capture conditions and are stored time-sequentially for each pattern (S703). After the completion of the entire experiment (S704), the images are analyzed time-sequentially for each pattern (S705). If there is an image with a saturated intensity value or an image with a null intensity value in the resulting data from the image analysis (S706), the analysis data is interpolated using the image acquired with another pattern at the same time as that image is acquired (S707). Furthermore, when the CCD camera is, for example, an 8-bit camera, an intensity value of 255 is the saturation value of image intensity, and, therefore, it is necessary to handle analysis data or images as images with pixel values of 9 bits or more, for example, as a 16-bit images, in order to avoid the inability to perform calculations when interpolating the analysis data.

The interpolation process will be described with reference to FIG. 6. For example, when tumor growth is observed with three exposure time patterns as described above, a change in intensity of the position of the tumor is analyzed using images for the three patterns by the same analysis method. Subsequently, for example, when the intensity value is saturated after a time t1 of Exp 1, a correlation, such as a ratio, between the data in the period of time from t0 to t1 where the intensity value of Exp 1 is not saturated and the analysis data of Exp 2 in the same period of time is computed, and, in the analysis after the time t1, ratios computed with respect to the Exp 2 data are normalized, and the normalized ratio is used. Furthermore, when the intensity value in the analysis data of Exp 2 is saturated after a time t2, the analysis data of Exp 3 is used.

In this embodiment, the analysis data of Exp 1 is mainly described in order to describe the interpolation process. However, the Exp 3 data, which is analysis data that is not saturated at all, may be used directly as the results of image analysis. In such a case, the analysis data of Exp 1 and Exp 2 can be used as complementary data at the time of low intensity to correct the whole experiment.

By doing so, images can be analyzed without impairing their quantitative properties.

In the above-described embodiment, fluorescence observation of a small animal is employed as an example, but it may be applied to fluorescence observation or luminescence observation of, for example, living cells and biological tissue or to luminescence observation of a small animal.

Furthermore, though three embodiments are described above, they may be used in combinations thereof. The structures of the apparatuses for fluorescence observation and luminescence observation are not limited thereto, and common microscopes may be used. It is possible to conduct similar control or to have similar functions by providing the controllers in the above-described embodiments as components.

What is claimed is:

1. An observation method of observing luminescence or fluorescence emitted from a biological specimen, comprising:
    a referring step of referring to image data previously acquired;
    an intensity determining step of determining whether the intensity of the image data previously acquired is saturated;
    an exposure dividing step of dividing the exposure of the image data previously acquired one time into a plurality of exposures and setting a single exposure time on the basis of divided times of the exposures, when the intensity is determined as being saturated in the intensity determining step;
    an image acquiring step of acquiring images same number of times as the number of divided exposures with the single exposure time set in the exposure dividing step; and
    an integrating step of integrating the images separately acquired in the image acquiring step into a single image having a number of bits in pixel values that is larger than a number of bits in pixel values of each of the images separately acquired.

2. The observation method of observing luminescence or fluorescence emitted from a biological specimen of claim 1, wherein the intensity determining step determines whether the intensity of the image data previously acquired is higher than a predetermined intensity value.

3. The observation method of observing luminescence or fluorescence emitted from a biological specimen of claim 2, wherein the predetermined intensity value is 90% of maximum intensity.

4. The observation method of observing luminescence or fluorescence emitted from a biological specimen of claim 1, wherein
    in the exposure dividing step, the exposure of the image data previously acquired one time are divided into a plurality of exposures so as to acquire images a plurality of times, and
    in the image acquiring step, all of the images are acquired repeatedly with the single exposure time set in the exposure dividing step.

5. The observation method of observing luminescence or fluorescence emitted from a biological specimen of claim 1, wherein an image acquirer is fixed relative to the biological specimen.

* * * * *